United States Patent
Mo

(10) Patent No.: US 9,594,682 B2
(45) Date of Patent: Mar. 14, 2017

(54) DATA ACCESS SYSTEM, MEMORY SHARING DEVICE, AND DATA READING METHOD

(71) Applicant: Huawei Technologies Co., Ltd., Shenzhen (CN)

(72) Inventor: Liangwei Mo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/804,649

(22) Filed: Jul. 21, 2015

(65) Prior Publication Data

US 2015/0324289 A1    Nov. 12, 2015

Related U.S. Application Data

(63) Continuation of application No. PCT/CN2013/079841, filed on Jul. 23, 2013.

(30) Foreign Application Priority Data

Feb. 6, 2013 (CN) .......................... 2013 1 0046412

(51) Int. Cl.
*G06F 12/08* (2016.01)
*G06F 3/06* (2006.01)
*G06F 15/167* (2006.01)

(52) U.S. Cl.
CPC .......... *G06F 12/0813* (2013.01); *G06F 3/067* (2013.01); *G06F 3/0608* (2013.01);
(Continued)

(58) Field of Classification Search
CPC .. G06F 12/0813; G06F 3/0608; G06F 3/0656; G06F 3/067; G06F 12/084; G06F 15/167
(Continued)

(56) References Cited

U.S. PATENT DOCUMENTS 4,410,944 A * 10/1983 Kronies .............. G06F 12/0822
                                                    700/5
5,633,865 A * 5/1997 Short ...................... H04L 12/46
                                                  370/401
(Continued)

FOREIGN PATENT DOCUMENTS

CN    1489058 A    4/2004
CN    1675625 A    9/2005
(Continued)

OTHER PUBLICATIONS

Partial English Translation and Abstract of Chinese Patent Application No. CN101840309, Jul. 22, 2015, 5 pages.
(Continued)

*Primary Examiner* — Stephen Elmore
(74) *Attorney, Agent, or Firm* — Conley Rose, P.C.

(57) ABSTRACT

A control apparatus sends a data access request to a first memory sharing device, wherein the data access request includes an address of target data. The first memory sharing device determines that the target data is stored in a second memory sharing device according to the address of the target data and an address list. The address list includes corresponding relationships between addresses and memory sharing devices, and first addresses corresponding to the first memory sharing device are different from second addresses corresponding to the second memory sharing device, and forward the data access request to the second memory sharing device. The second memory sharing device obtains the target data based on the address of the target data, and sends the target data to the first memory sharing device. Then the first memory sharing device forwards the target data to the control apparatus.

9 Claims, 9 Drawing Sheets

(52) U.S. Cl.
CPC .......... *G06F 3/0656* (2013.01); *G06F 12/084* (2013.01); *G06F 15/167* (2013.01); *G06F 2212/1008* (2013.01); *G06F 2212/154* (2013.01); *G06F 2212/163* (2013.01); *G06F 2212/254* (2013.01); *G06F 2212/263* (2013.01); *G06F 2212/62* (2013.01)

(58) Field of Classification Search
USPC .... 711/3, 130, 147, 148, 154, 156, 165, 221
See application file for complete search history.

(56) References Cited

U.S. PATENT DOCUMENTS

| | | | | |
|---|---|---|---|---|
| 6,055,605 | A * | 4/2000 | Sharma | G06F 12/084 711/130 |
| 7,543,133 | B1 * | 6/2009 | Scott | G06F 12/0813 711/147 |
| 8,275,963 | B2 * | 9/2012 | Arimilli | G06F 12/0811 711/165 |
| 8,650,381 | B2 * | 2/2014 | Tatara | G06F 3/0604 711/154 |
| 8,656,137 | B2 * | 2/2014 | Koob | G06F 13/28 711/202 |
| 8,930,672 | B2 * | 1/2015 | Jang | G06F 12/1072 711/118 |
| 9,405,477 | B2 * | 8/2016 | Ganapathi | G06F 3/0614 |
| 2002/0065988 | A1 * | 5/2002 | Lasserre | G06F 1/206 711/122 |
| 2003/0229770 | A1 | 12/2003 | Jeddeloh | |
| 2004/0073742 | A1 | 4/2004 | Arimilli et al. | |
| 2004/0073743 | A1 | 4/2004 | Arimilli et al. | |
| 2006/0212673 | A1 * | 9/2006 | Fukuguchi | G06F 3/0605 711/173 |
| 2010/0228894 | A1 | 9/2010 | Strulovici et al. | |
| 2011/0252202 | A1 * | 10/2011 | Heine | G06F 12/0815 711/141 |
| 2013/0036279 | A1 * | 2/2013 | Tatara | G06F 3/0604 711/162 |
| 2013/0117347 | A1 | 5/2013 | Yamauchi et al. | |
| 2014/0258643 | A1 * | 9/2014 | Ganapathi | G06F 3/0614 711/147 |

FOREIGN PATENT DOCUMENTS

| | | |
|---|---|---|
| CN | 101135953 A | 3/2008 |
| CN | 101158927 A | 4/2008 |
| CN | 101840309 A | 9/2010 |
| CN | 101876925 A | 11/2010 |
| CN | 102122257 A | 7/2011 |
| CN | 102609466 A | 7/2012 |
| CN | 102650932 A | 8/2012 |
| CN | 103152394 A | 6/2013 |
| JP | H05290000 A | 11/1993 |
| WO | 2011161787 A1 | 12/2011 |

OTHER PUBLICATIONS

Partial English Translation and Abstract of Chinese Patent Application No. CN103152394, Jul. 22, 2015, 3 pages.
Foreign Communication From a Counterpart Application, PCT Application No. PCT/CN2013/079841, English Translation of International Search Report dated Nov. 21, 2013, 3 pages.
Foreign Communication From a Counterpart Application, PCT Application No. PCT/CN2013/079841, English Translation of Written Opinion dated Nov. 21, 2013, 16 pages.
Hagersten, E., et al., "DDM—A Cache-Only Memory Architecture," XP000309583, Swedish Institute of Computer Science, vol. 25, No. 9, Sep. 25, 1992, pp. 44-54.
Dahlgren, F., et al., "Cache-Only Memory Architectures," XP000829617, IEEE, vol. 32, No. 6, Jun. 1999, pp. 72-79.
Foreign Communication From a Counterpart Application, European Application No. 13874270.5, Extended European Search Report dated Dec. 16, 2015, 8 pages.
Foreign Communication From a Counterpart Application, Chinese Application No. 201310046412.4, English Translation of Chinese Office Action dated May 5, 2015, 14 pages.
Partial English Translation and Abstract of Japanese Patent Application No. JPH05290000, Jan. 11, 2017, 7 pages.
Foreign Communication From a Counterpart Application, Japanese Application No. 2015-556369, Japanese Office fiction dated Nov. 29, 2016, 3 pages.
Foreign Communication From a Counterpart Application, Japanese Application No. 2015-556369, English Translation of Japanese Office Action dated Nov. 29, 2016, 4 pages.

* cited by examiner

DATA ACCESS SYSTEM, MEMORY SHARING DEVICE, AND DATA READING METHOD

CROSS-REFERENCE TO RELATED APPLICATIONS

This application is a continuation of International Application No. PCT/CN2013/079841, filed on Jul. 23, 2013, which claims priority to Chinese Patent Application No. 201310046412.4, filed on Feb. 6, 2013, both of which are hereby incorporated by reference in their entireties.

TECHNICAL FIELD

The present disclosure relates to the Internet field, and in particular, to a data access system, a memory sharing device, and a data reading method.

BACKGROUND

Currently, with the development and popularity of the Internet, a distributed system is applied more widely. A distributed file system (DFS) refers to a software system established on a network. The distributed file system is characterized by high cohesion and transparency. The cohesion means that each distributed database node in the system has a high degree of autonomy; and the transparency means that each distributed database node is transparent to an application of a user. However, a speed of response to sharing access between distributed systems affects overall performance of the distributed systems.

In the prior art, in order to solve a problem of information sharing between distributed systems, a switched network-based information sharing manner shown in FIG. 1 is generally used. In FIG. 1, a Central Processing Unit (CPU) in a control system A that serves as an acquirer wants to acquire data in a memory unit in a control system B that serves as a provider, and a process is as follows. (1) The CPU in the control system A sends a request message to a CPU in the control system B; (2) the CPU in the control system B reads data from the memory unit in the control system B according to the request message; (3) the CPU in the control system B returns an execution result carrying the data to the CPU in the control system A; (4) the CPU in the control system A extracts the data from the execution result and forwards the data to an upper system for processing. In the foregoing process, all transmission of the data needs to undergo processing with participation of the CPUs in the control system A and the control system B.

By using an existing switched network-based information sharing manner as an example, in a process shown in FIG. 2, a CPU in a control system A wants to acquire data in a memory unit in a control system B, which means that the control system A serves as an acquirer and the control system B serves as a provider. A specific process is, in a procedure shown in FIG. 2 by using solid lines, when executing a program, the CPU in the control system A needs to acquire data in a memory of the control system B, and the CPU in the control system A sends a request message to a CPU in the control system B through a switch fabric; after parsing the request message, the CPU in the control system B learns that the CPU in the control system A needs to acquire the data in the memory of the control system B, then the CPU in the control system B accesses the memory unit in the memory of the control system B according to the request message and acquires the data from the memory unit; after acquiring the data from the memory unit, the CPU in the control system B feeds back the acquired data to the CPU in the control system A, which is a procedure shown in FIG. 2 by using dashed lines. The CPU in the control system B returns an execution result carrying the data to the CPU in the control system A by using the switch fabric. The CPU in the control system A acquires the data from the execution result and submits the data to an upper system for processing. Therefore, in the switched network-based information sharing manner in the prior art, when the control system A acquires data in the control system, both of the CPUs in the control system A and control system B need to participate in processing. Especially when multiple control systems mutually acquire data in another control system, CPUs in the multiple control systems all participate in processing, so that performance of a CPU in a control system that serves as a provider is excessively consumed in an entire information sharing process, which causes a waste of the CPU. In addition, when a running CPU is faulty in any control system that serves as a provider is faulty, data owned by the control system cannot be accessed by another control system, thereby lowering reliability of an entire system.

Therefore, the prior art has the following disadvantages. (1) The CPUs in the control system A and the control system B both need to participate in sharing control of information, so that the performance of the CPU in the control system that serves as the provider is excessively consumed in the entire information sharing process, which causes a waste of the CPU; (2) when the running CPU is faulty in the control system B that serves as the provider is faulty, data owned by the control system B cannot be accessed by another terminal, thereby lowering reliability of the entire system.

SUMMARY

An objective of the present disclosure is to provide a data access system, so as to solve a problem in the prior art that a waste of a CPU is caused and reliability of an entire system is lowered because performance of the CPU in a control system that serves as a provider is excessively consumed. A method, an apparatus, and a system for information processing are provided.

According to a first aspect, an embodiment of the present disclosure provides a data access system, where the system includes a memory sharing resource pool formed by at least two memory sharing devices, and at least two control devices corresponding to the memory sharing devices in the memory sharing resource pool, any of the memory sharing devices includes unified addressed memory units that are configured to store data; when a first memory sharing device in the memory sharing devices receives a memory access request that carries address information and is sent by a first control device corresponding to the first memory sharing device. If memory units corresponding to the address information are memory units in the first memory sharing device, the first memory sharing device reads data from the memory units in the first memory sharing device and feeds back the data to the first control device; if the memory units corresponding to the address information are memory units in a second memory sharing device in the memory sharing resource pool, the first memory sharing device forwards the memory access request to the second memory sharing device and receives data that is in the memory units in the second memory sharing device and is fed back by the second memory sharing device, and when the first memory sharing device in any of the memory sharing devices receives a memory access request that carries address information and is forwarded by the second memory sharing device, the first memory sharing device reads data and feeds back the read data to the second memory sharing device.

Based on the first aspect, in a first possible implementation manner, the memory sharing device includes a storage module, a processing module, and a communication unit, where the storage module is connected to the processing module, and the storage module includes at least one unified addressed memory unit in the memory sharing resource pool, where the memory unit is configured to store data, and the processing module is connected to one control device by using a communication interface, is connected to second memory sharing devices in the memory sharing resource pool via the communication unit, receives, through the communication interface, memory access requests that are sent by the control device connected to the processing module, and receives, by using the communication unit, memory access requests that are forwarded by the second memory sharing devices, and/or forwards, to the second memory sharing devices in the memory sharing resource pool, the memory access requests that are sent by the control device, where the memory access requests that are forwarded by the second memory sharing devices are received by the second memory sharing devices from a corresponding control device, the memory access requests include address information of memory units that have undergone unified addressing in multiple memory sharing devices in the memory sharing resource pool, and the address information is used to acquire data in a memory unit in any memory sharing device in the memory sharing resource pool.

Based on the first possible implementation manner of the first aspect, in a second possible implementation manner of the first aspect, the memory sharing device broadcasts a query message to the second memory sharing devices in the memory sharing resource pool by using the communication unit, to acquire addressing data of the memory units that have undergone the unified addressing in the memory sharing resource pool, and stores the acquired addressing data in the processing module.

Based on the first aspect, in a third possible implementation manner of the first aspect, any control device in the two control devices includes a communication module, where the communication module of the any control device accesses the data access system by connecting a pluggable memory sharing module.

Based on the first aspect or the first to the third possible implementation manners of the first aspect, in a fourth possible implementation manner of the first aspect, the communication interface is a high-speed system bus, a switch, or an Ethernet interface.

According to a second aspect, an embodiment of the present disclosure provides a memory sharing device, including a storage module, a processing module, and a communication unit, where the storage module is connected to the processing module and is configured to store data, and the processing module is connected to one control device by using a communication interface, is connected, via the communication unit, to second memory sharing devices in a memory sharing resource pool in which the memory sharing device is located, receives, through the communication interface, memory access requests that are sent by the control device connected to the processing module, and receives, by using the communication unit, memory access requests that are forwarded by the second memory sharing devices in the memory sharing resource pool, and/or forwards, to the second memory sharing devices in the memory sharing resource pool, the memory access requests that are sent by the control device, where the memory access requests that are forwarded by the second memory sharing devices are received by the second memory sharing devices from a corresponding control device, the memory access requests include address information of memory units that have undergone unified addressing in multiple memory sharing devices in the memory sharing resource pool, and the address information is used to acquire data in a memory unit in any memory sharing device in the memory sharing resource pool.

Based on the second aspect, in a first possible implementation manner of the second aspect, after receiving, by using the communication unit, the memory access requests that are forwarded by the second memory sharing devices in the memory sharing resource pool, the processing module acquires data from memory units corresponding to the address information carried in the memory access requests, and returns a result to the second memory sharing devices by using the communication unit; the second memory sharing devices return, through the communication interface, the result to the control device which sends the memory access requests to the second memory sharing devices.

Based on the second aspect, in a second possible implementation manner of the second aspect, the processing module further includes a determining unit. If the determining unit determines that a first part of memory units in the memory units corresponding to the address information are in the local memory sharing device, and a second part is in a second memory sharing device, the processing module reads data in the first part of the memory units from the storage module in the local memory sharing device, deletes addresses of the first part of the memory units in the address information in the memory access requests, and forwards a memory access request including only addresses of the second part of the memory units to the second memory sharing device by using the communication unit.

Based on the second aspect or the first or the second possible implementation manner of the second aspect, in a third possible implementation manner of the second aspect, the memory sharing device further includes a power module configured to provide electric energy for the storage when there is no external power supply, and the memory sharing device forms a pluggable nonvolatile random access memory (NVRAM) by using the power module.

Based on the second aspect or the first to the third possible implementation manners of the second aspect, in a fourth possible implementation manner of the second aspect, the memory sharing device further includes a management module configured to debug an application program in the storage module and control traffic in the communication unit.

Based on the second aspect or the first to the fourth possible implementation manners of the second aspect, in a fifth possible implementation manner of the second aspect, the processing module is a field programmable gate array (FPGA).

According to a third aspect, an embodiment of the present disclosure provides a data reading method, where the method includes receiving, by a first memory sharing device in a memory sharing resource pool, a memory access request sent by a first control device that controls the first memory sharing device, where the memory access request includes address information, the address information is addresses of one or more memory units that are configured to store data and have undergone the unified addressing in at least two memory sharing devices in the memory sharing resource pool, any memory sharing device in the at least two memory sharing devices reads data under control of one control device in at least two control devices, and the first memory sharing device is one of the at least two memory sharing devices, determining, by the first memory sharing device according to the address information, a memory sharing device in which memory units corresponding to the address information are located, if the memory sharing device in which the memory units corresponding to the address information are located is the first memory sharing device, acquiring, by the first memory sharing device, data from the memory units corresponding to the address information in the first memory sharing device itself, or if the memory sharing device in which the memory units corresponding to the address information are located is a second memory sharing device, forwarding, by the first memory sharing device, the memory access request to the second memory sharing device, and receiving data returned by the second memory sharing device, and reading, by the first memory sharing device, the data, and feeding back the data to the first control device.

Based on the third aspect, in a first possible implementation manner, before the receiving, by a first memory sharing device in a memory sharing resource pool, a memory access request sent by a first control device that controls the first memory sharing device, the method further includes broadcasting, by the first memory sharing device in the memory sharing resource pool, a query message to second memory sharing devices in the memory sharing resource pool, to acquire addressing data of memory units in all the memory sharing devices in the memory sharing resource pool.

The data access system provided in the embodiments of the present disclosure includes a memory sharing resource pool formed by at least two memory sharing devices, and at least two control devices that correspond to the memory sharing devices in the memory sharing resource pool, where any memory sharing device includes unified addressed memory units that are configured to store data, and the memory sharing device reads data from the memory units according to a control device corresponding to the memory sharing device. When data is read from second memory device in the memory sharing resource pool, a workload of a control device that serves as a provider in the prior art is reduced, and usage of the control device that serves as the provider is increased; meanwhile, data required by each control system is stored in the memory sharing resource pool, and each control system can share data of another control system, thereby improving reliability of stored data in a distributed system.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following further describes the technical solutions of the present disclosure in detail with reference to accompanying drawings and embodiments.

An embodiment of the present disclosure provides a data access system including at least two memory sharing devices and at least two control devices connected to the memory sharing devices by using a communication interface. The at least two memory sharing devices form a memory sharing resource pool in the data access system; each control device corresponds to each memory sharing device; when one control device in the at least two control devices wants to read data in the memory sharing resource pool, the control device reads required data in the memory sharing resource pool by using a memory sharing device corresponding to the control device.

Figure 1:
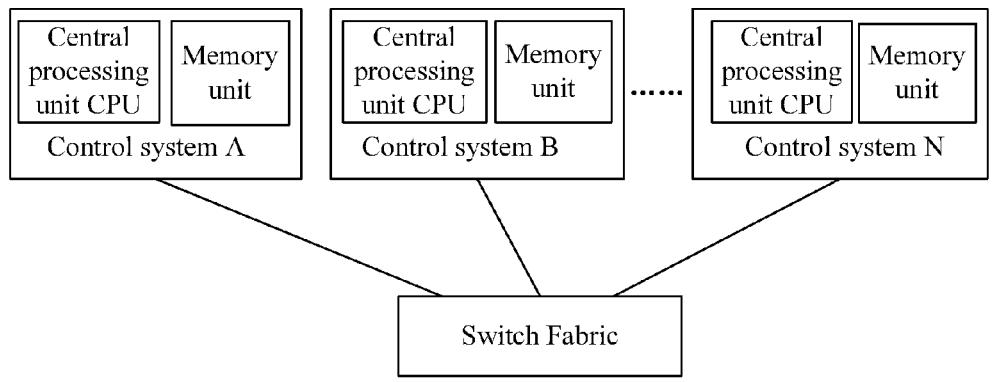
FIG. 1 is a structural diagram of an information sharing manner according to the prior art.
Figure 2:
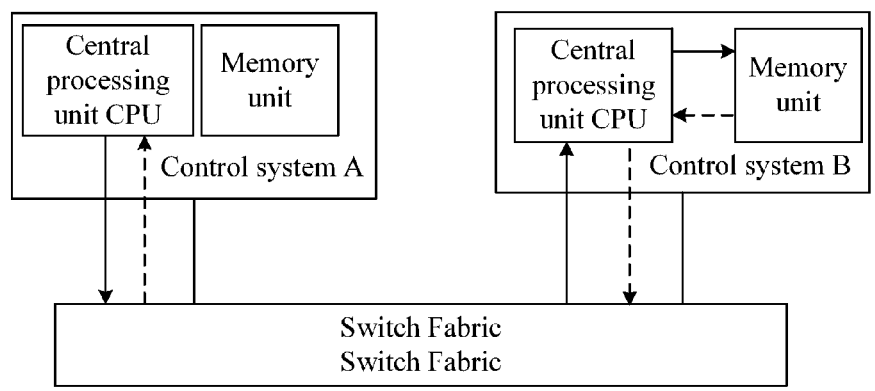
FIG. 2 is a schematic flowchart of the information sharing manner according to the prior art.
Figure 3:
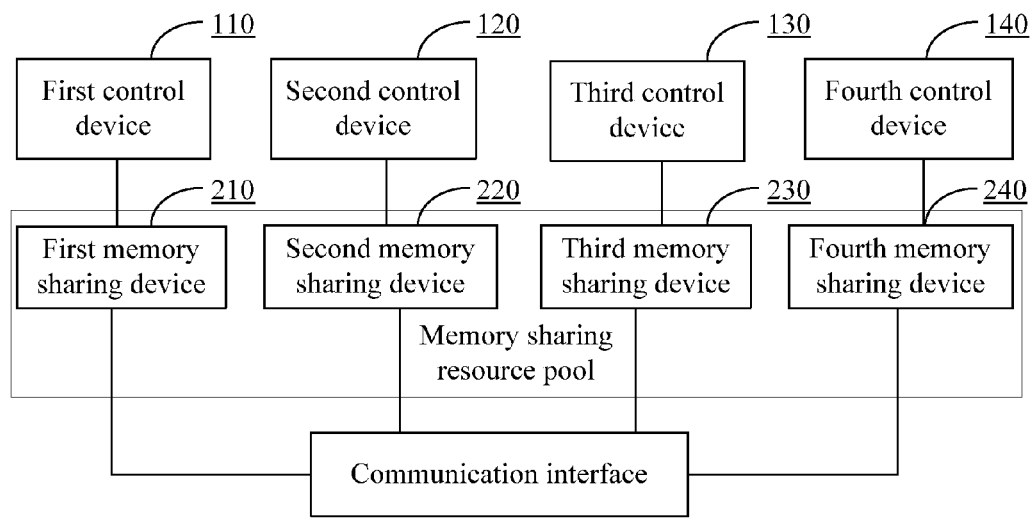
FIG. 3 is a schematic diagram of a data access system according to an embodiment of the present disclosure.

As shown in FIG. 3, this embodiment of the present disclosure provides a data access system, where the system includes a memory sharing resource pool formed by at least two memory sharing devices, and multiple control devices connected to the memory sharing devices by using a communication interface. The communication interface includes but is not limited to a high-speed system bus, a switch, or an Ethernet interface. The multiple memory sharing devices form the memory sharing resource pool, where each memory sharing device corresponds to one of the multiple control devices and establishes a control relationship with one of the multiple control devices. If each memory sharing device and the one of the multiple control devices are connected by using a high-speed system bus, the control device connected to each memory sharing device controls the memory sharing device; if a control device is connected to a memory sharing device over a network by using a switch or an Ethernet interface, a correspondence can be established between the memory sharing device and the control device in a manner such as port configuration or Internet Protocol (IP) allocation, so as to achieve an objective that one control device controls one distributed node.

Any memory sharing device in the memory sharing resource pool includes unified addressed memory units that are configured to store data; when a first memory sharing device in the memory sharing devices receives a memory access request that carries address information and is sent by a first control device corresponding to the first memory sharing device. If memory units corresponding to the address information are memory units in the first memory sharing device, the first memory sharing device reads data from the memory units in the first memory sharing device and feeds back the data to the first control device; if the memory units corresponding to the address information are memory units in a second memory sharing device in the memory sharing resource pool, the first memory sharing device forwards the memory access request to the second memory sharing device and receives data that is in the memory units in the second memory sharing device and is fed back by the second memory sharing device, and when the first memory sharing device in any of the memory sharing devices receives a memory access request that carries address information and is forwarded by the second memory sharing device, the first memory sharing device reads data from the first memory sharing device and feeds back the read data to the second memory sharing device.

Figure 4:
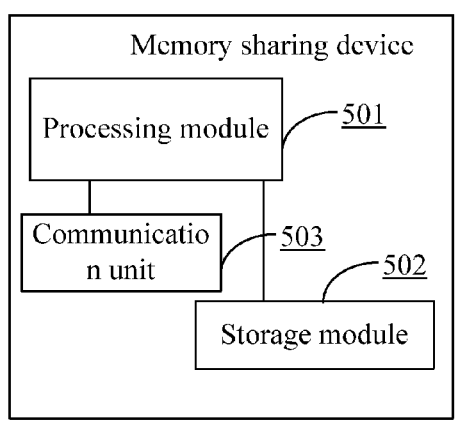
FIG. 4 is a schematic diagram of a memory sharing device in the data access system according to the embodiment of the present disclosure.

As shown in FIG. 4, each memory sharing device includes a processing module 501, a storage module 502, and a communication unit 503. By using the communication unit 503, the memory sharing device can communicate with a second memory sharing device, where these memory sharing devices belong to a same memory sharing resource pool; the storage module 502 includes multiple memory units, where the memory units undergo unified addressing in the entire memory sharing resource pool, and the memory units are configured to store data; the processing module 501 is configured to process the memory access request received from the control device and read data from the storage module 502. The processing module 501 of each memory sharing device may store one address table, and the address table records addresses of all memory units in the memory sharing resource pool.

The processing module 501 in the memory sharing device is connected to one control device by using the communication interface, receives, through the communication interface, memory access requests that are sent by the control device connected to the processing module 501, is connected to a second memory sharing device in the memory sharing resource pool via the communication unit 503, and receives, by using the communication unit 503, memory access requests that are forwarded by the second memory sharing device. In addition, after the processing module 501 receives the memory access requests that are sent by the control device connected to the processing module 501, when memory units that are to be accessed by the memory access requests are in the second memory sharing device, the processing module 501 forwards, by using the communication unit 503, the requests to the memory sharing devices in which the to-be-accessed memory units are located. The memory access requests include address information. The processing module 501 determines the memory sharing devices in which the memory units that the control device wants to access are located, and acquires data in any memory sharing device in the memory sharing resource pool, where the data is located in the memory units in the storage module 502 in the memory sharing device.

The virtual memory sharing resource pool in this embodiment of the present disclosure can be implemented in the following manner. The memory sharing devices form a data switched domain by using the communication unit, perform unified addressing on memory units included in the data switched domain, and send address information that has undergone addressing to the memory sharing devices in the switched domain.

As shown in FIG. 3, when a first control device 110 that serves as an acquirer needs to acquire required data from the memory sharing resource pool, the first control device 110 sends a memory access request to a first memory sharing device 210 corresponding to the first control device 110, where the memory access request carries address information of the data that the first control device 110 wants to acquire; the first memory sharing device 210 performs querying according to the address information and an address table in a processing module 501, to determine a storage location of the data required by the first control device 110. When the data required by the first control device 110 is in a memory unit in a storage module 502 in the first memory sharing device 210, data in the memory unit in the storage module 502 is directly accessed and is fed back to the first control device 110; when the data required by the first control device 110 is not in the storage module 502 in the first memory sharing device 210, the access request is sent, by using a communication unit 503 in the first memory sharing device 210, to a memory sharing device (for example, a second memory sharing device 220) corresponding to the address information in the memory access request, so that the data required by the first control device is acquired. When the data required by the first control device 110 is not in the first memory sharing device 210, an entire process of acquiring the data does not need participation of a second control device 120, without consuming a resource in the second control device 120. In this embodiment of the present disclosure, a process of accessing and acquiring data in a memory unit is completed by a memory sharing device, thereby reducing a workload of a processor in a control device that serves as a provider in the prior art, and increasing usage of the processor in the control device that serves as the provider; meanwhile, data required by each control device is stored in a memory sharing resource pool, and each control device can share data of another control device, thereby solving a problem of information sharing in a distributed system and improving real-time performance of information sharing between distributed systems.

The following further describes several embodiments of the foregoing system in detail with reference to accompanying drawings.

Figure 5A:
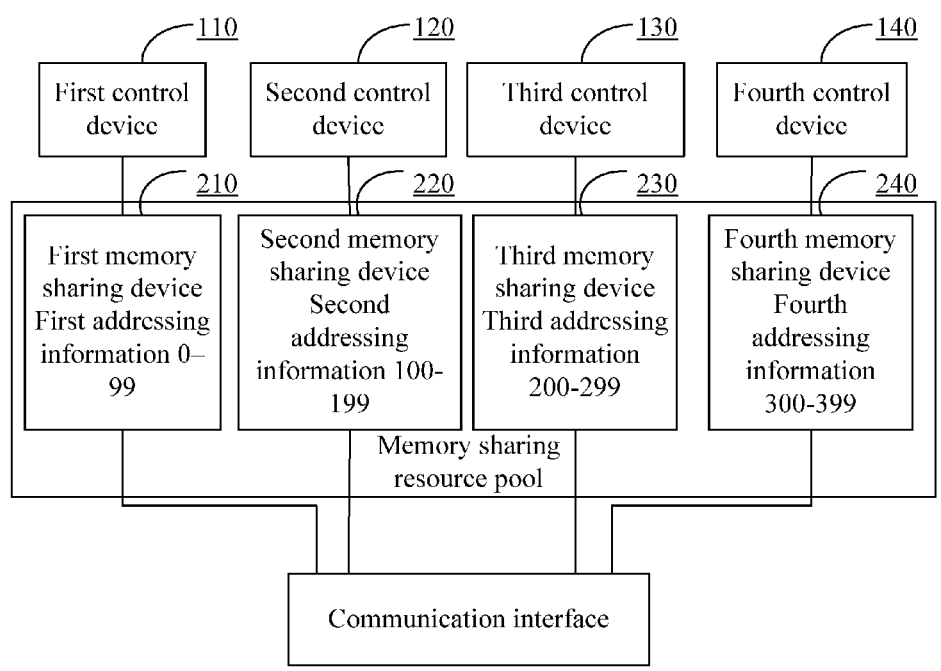
FIG. 5A is a schematic diagram of a working process of a memory sharing device in an implementation manner of the present disclosure.

FIG. 5A is a schematic diagram of memory unit addressing information of memory sharing devices according to an embodiment of the present disclosure. In FIG. 5A, that four memory sharing devices form a memory sharing resource pool is used as an example for description, and in an actual application, it is not limited to four memory sharing devices for forming a memory sharing resource pool. The four memory sharing devices are separately connected to control devices through high-speed system buses. For example, the following control devices are shown in FIG. 5A: first control device 110, second control device 120, third control device 130 and fourth control device 140. A processing module 501 in each memory sharing device implements addressing of memory units in a storage module 502 of each memory sharing device to define storage space of each memory sharing device. A first memory sharing device 210, a second memory sharing device 220, a third memory sharing device 230, and a fourth memory sharing device 240 form a memory sharing resource pool. Addressing information of each memory sharing device is shown in FIG. 5A. First addressing information of the first memory sharing device 210 is 0-99; second addressing information of the second memory sharing device 220 is 100-199; third addressing information of the third memory sharing device 230 is 200-299; fourth addressing information of the fourth memory sharing device 240 is 300-399.

After the memory sharing resource pool is formed, the processing module in each memory sharing device defines addressing information of the memory units in the storage module 502 of each memory sharing device, and sends a query message to the other three memory sharing devices in the memory sharing resource pool by using a communication unit 503, to acquire addressing information of internal memory units in the other memory sharing devices.

The processing module 501 in each memory sharing device generates an address information table according to the addressing information of the memory units in each memory sharing device and the addressing information of the internal memory units in the other memory sharing devices, where the address information table is used for the memory sharing device to rapidly look up a location of a memory unit.

Figure 5B:
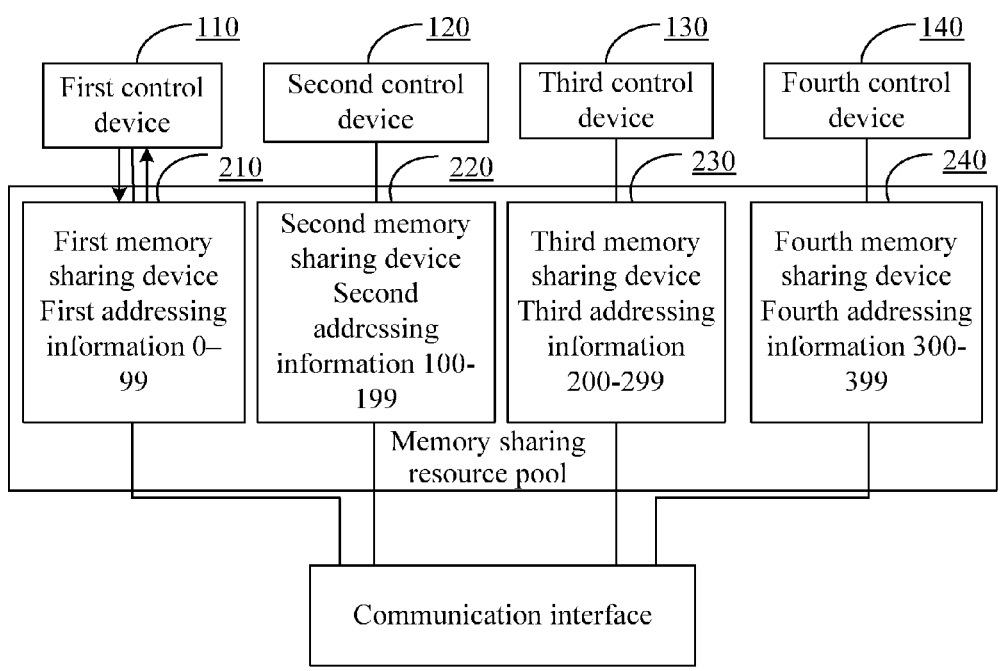
FIG. 5B is a schematic diagram of a working process of a memory sharing device in another implementation manner of the present disclosure.

In a first preferable embodiment, as shown in FIG. 5B, a first control device 110 wants to access data in memory units with an offset 58 and a length 10. The first control device 110 sends a memory access request to a first memory sharing device 210 through a high-speed system bus, where the memory access request includes memory address information. After receiving the memory access request, a processing module 501 of the first memory sharing device 210 parses the memory access request, extracts the address information in the memory access request, and determines that the first control device 110 wants to access the data in the memory units with the offset 58 and the length 10, that is, data in memory units whose addressing information is 58 to 67. The processing module 501 looks up the address information table and determines locations of the memory units 58 to 67 according to the address information table. The processing module 501 determines, according to the address information table, that the memory units whose addressing information is 58 to 67 exist in the local storage module 502, and the processing module 501 accesses the memory units whose addressing information is 58 to 67. After completing the access, the processing module 501 generates a result message, where the result message carries the data stored in the memory units 58 to 67. The processing module 501 sends the acquired data to the first control device 110 through the high-speed system bus.

Figure 5C:
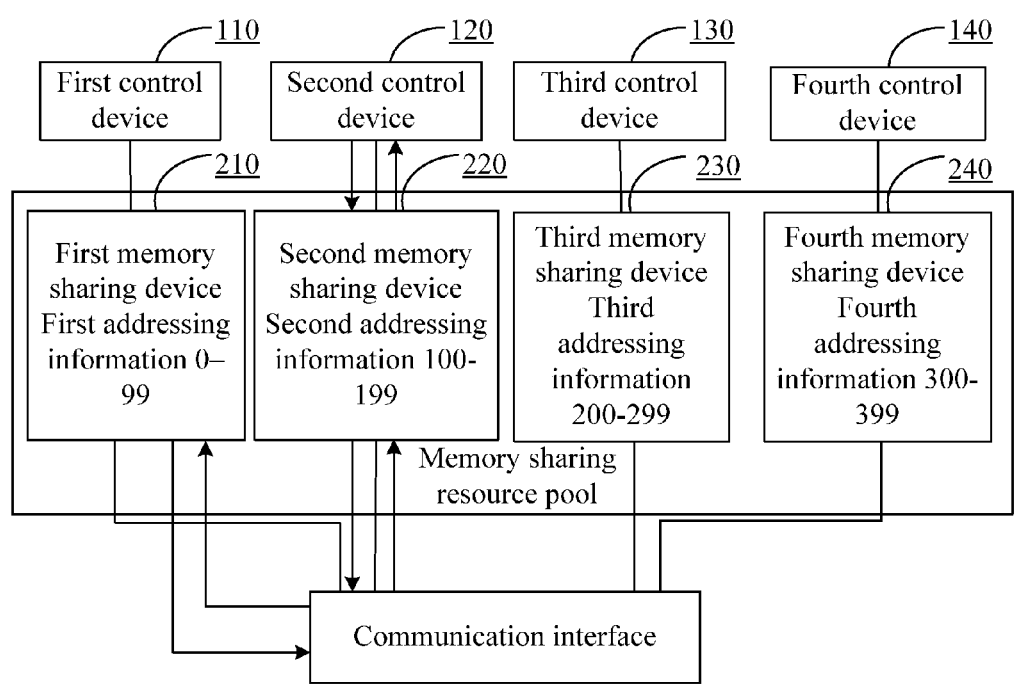
FIG. 5C is a schematic diagram of a working process of a memory sharing device in another implementation manner of the present disclosure.

In a second preferable embodiment, as shown in FIG. 5C, a second control device 120 wants to access data in memory units with an offset 58 and a length 10. The second control device 120 sends a memory access request to a processing module 501 of a second memory sharing device 220 through a high-speed system bus, where the memory access request includes memory address information. After receiving the memory access request, the processing module 501 of the second memory sharing device 220 parses the memory access request, extracts information in the memory access request, and determines that the second control device 120 wants to access the data in the memory units with the offset 58 and the length 10, that is, data in memory units whose addressing information is 58 to 67. The processing module 501 of the second memory sharing device 220 performs a search and determines locations of the memory units 58 to 67 according to the address information table. The processing module 501 of the second memory sharing device 220 determines, according to the address information table, that the memory units whose addressing information is 58 to 67 do not exist in a storage module 502 of the local second memory sharing device 220, but exist in a storage module 502 of a first memory sharing device 210, and the processing module 501 of the second memory sharing device 220 forwards the memory access request to the first memory sharing device 210 by using the communication unit. After receiving the memory access request, the first memory sharing device 210 transmits the message to a processing module 501 of the first memory sharing device 210, and the processing module 501 of the first memory sharing device 210 performs corresponding processing. After performing a search and determining, according to the address information table, that the memory address information included in the memory access request exists in the local storage module 502, the processing module 501 of the first memory sharing device 210 accesses the memory units whose addressing information is 58 to 67. After completing the access, the processing module 501 of the first memory sharing device 210 generates a result message. The processing module 501 of the first memory sharing device 210 transmits the result message to the processing module 501 of the second memory sharing device by using a communication unit 503, and then the processing module 501 of the second memory sharing device 220 sends the result message to the second control device 120 through the high-speed system bus, where the result message carries the data stored in the memory units 58 to 67. In this embodiment of the present disclosure, when a second control device 120 needs to acquire data from a memory sharing resource pool, even if the data required by the second control device 120 is not in a second memory sharing device 220 controlled by the second control device 120, it is only necessary that the second memory sharing device 220 forwards a memory access request received by the second memory sharing device 220, to acquire the data required by the second control device 120 from second memory sharing device, without participation of another control device, thereby saving consumption of the another control device.

In a third preferable embodiment, as shown in FIG. 5C, a second control device 120 wants to access data in memory units with an offset 58 and a length 100. The second control device 120 sends a memory access request to a second memory sharing device 220 through a high-speed system bus, where the memory access request includes memory address information. A processing module 501 of the second memory sharing device 220 parses the memory access request, extracts information in the memory access request, and determines that the second control device 120 wants to access the data in the memory units with the offset 58 and the length 100, that is, data in memory units whose addressing information is 58 to 157. The processing module 501 of the second memory sharing device 220 performs a search and determines locations of the memory units 58 to 157 according to the address information table. The processing module 501 of the second memory sharing device 220 determines, according to the address information table, that the memory units whose addressing information is 58 to 157 do not all exist in a storage module 502 of the local second memory sharing device 220, but partly exist in a storage module 502 of a first memory sharing device 210 (58 to 99) and partly exist in the storage module 502 of the second memory sharing device 220 (100 to 157), and the processing module 501 of the second memory sharing device 220 forwards the memory access request to the first memory sharing device, where the memory access request includes the memory address information. The processing module of the second memory sharing device 220 determines that the memory units whose addressing information is 100 to 157 exist in the storage module 502 of the second memory sharing device 220, the processing module 501 of the second memory sharing device 220 accesses the memory units whose addressing information is 100 to 157. After completing the access, the processing module 501 of the second memory sharing device 220 generates a first result message, where the first result message carries the data stored in the memory units 100 to 157.

After the first memory sharing device 210 receives the memory access request forwarded by the second memory sharing device 220, the processing module 501 of the first memory sharing device 210 performs corresponding processing. After performing a search and determining that the memory address information included in the memory access request exists in the storage module 502 of the local first memory sharing device 210, the processing module 501 of the first memory sharing device 210 accesses the memory units whose addressing information is 58 to 99. After completing the access, the processing module 501 of the first memory sharing device 210 generates a second result message, where the second result message carries the data stored in the memory units 58 to 99. The processing module 501 of the first memory sharing device 210 transmits the second result message to the processing module 501 of the second memory sharing device 220.

The processing module 501 of the second memory sharing device 220 sends, through the high-speed system bus, the first result message that carries the data required by the second control device 120 and is generated by the processing module 501 of the second memory sharing device 220, and the received second result message to the second control device 120. According to the third embodiment, when a second control device 120 needs to acquire data from a memory sharing resource pool, even if the data required by the second control device 120 is not stored only in a second memory sharing device 220 controlled by the second control device 120 but is distributedly stored, the second memory sharing device 220 locally reads part of data stored in the second memory sharing device 220; in addition, it is only necessary that the second memory sharing device 220 forwards a memory access request that carries only a storage address of remaining data to second memory sharing devices after reprocessing a memory access request received by the second memory sharing device 220, to acquire the data required by the second control device 120 from the second memory sharing devices, without participation of another control device, thereby saving consumption of the another control device.

The foregoing several embodiments describe communication between a control device and a memory sharing device and communication between memory sharing devices in detail. In an actual application, it is not limited to communication between two memory sharing devices described in the foregoing embodiments. According to the foregoing several embodiments, it can be simply and conveniently implemented that a control device that serves as an acquirer shares data in a memory sharing device.

Figure 6:
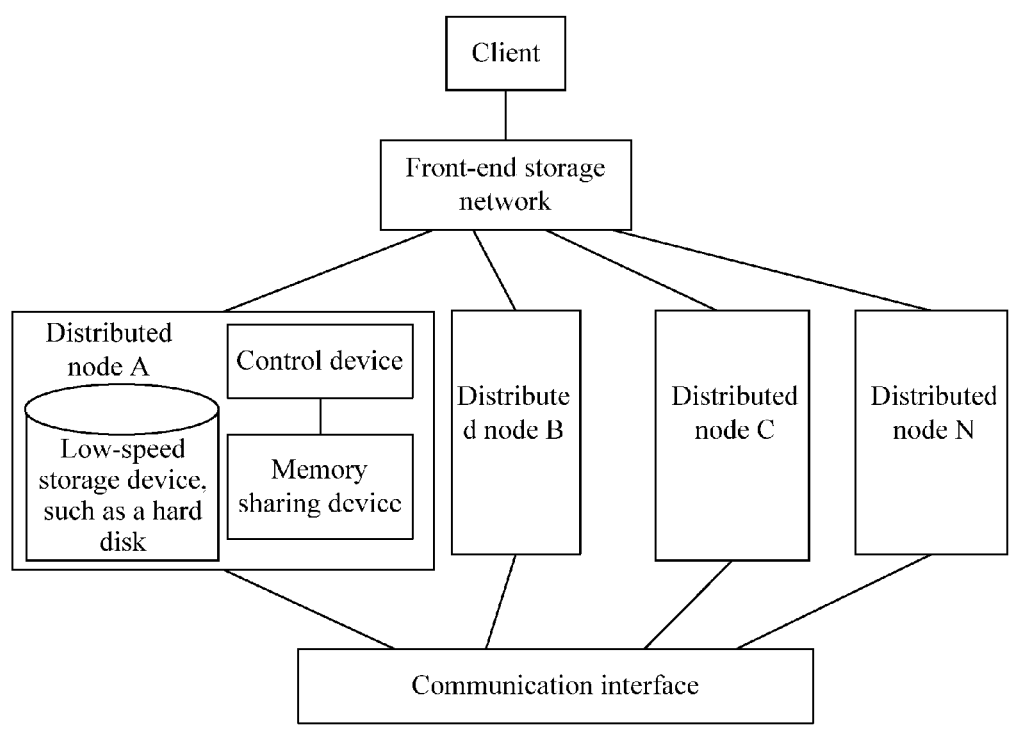
FIG. 6 is an architecture diagram of another implementation manner of the data access system according to the embodiment of the present disclosure.

In an application manner of the foregoing embodiments, as shown in FIG. 6, each control device, which is alternatively called a CPU subsystem, and a memory sharing device corresponding to the control device form a distributed node. Corresponding to hardware, each distributed node may be one rack, and each rack server is one control device. After one memory sharing device is plugged in, memory sharing devices, which are interconnected through a switch, in multiple racks form one memory sharing resource pool. Each rack server can access data in any memory sharing device in the memory sharing resource pool.

Figure 7:
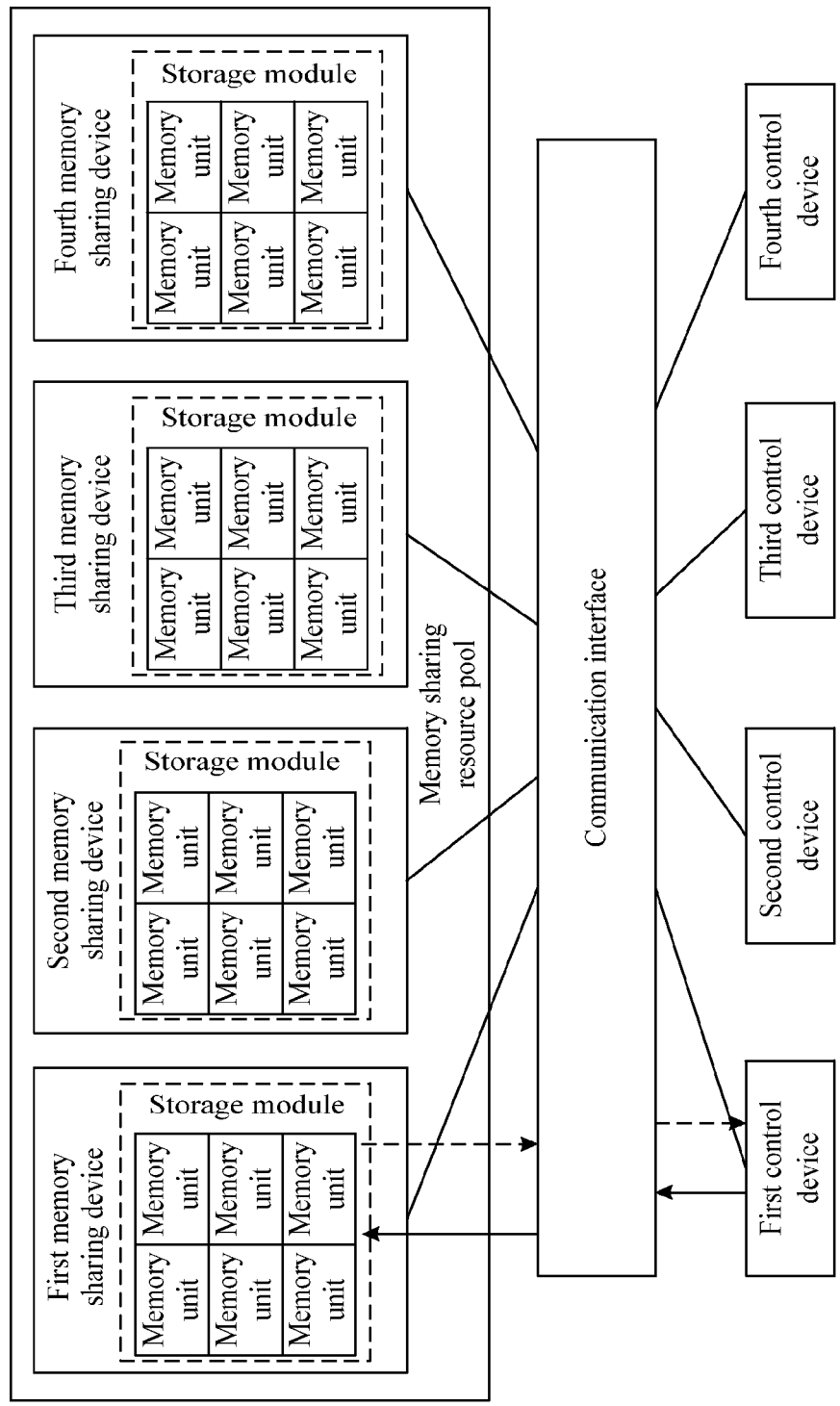
FIG. 7 is a structural diagram of another embodiment of the data access system according to the embodiment of the present disclosure.

In another possible implementation manner, as shown in FIG. 7, each control device is connected to a memory sharing device in a memory sharing resource pool by using a communication interface, where the communication interface is, for example, a switch or an Ethernet interface. If a control device that is not connected to the data access system needs to access the data access system, it is only necessary that the control device is connected, by using a slot and flat cable, to a memory sharing device including a matching slot and flat cable interface, and then the memory sharing device rebroadcasts a query message, to acquire addressing of memory units in all memory sharing devices in the memory sharing resource pool, so that the control device can access the entire data access system, which is not further described herein. By using the expandable memory sharing resource pool, memory space can reach a preset (PB) level or higher.

In the embodiments of the present disclosure, a process in which a control device acquires data in a memory unit in a memory sharing device in a memory sharing resource pool is completed by the memory sharing device, thereby replacing a CPU in a control device that serves as a provider in the prior art, reducing a workload of the CPU in the control device that serves as the provider in the prior art, and increasing usage of the CPU in the control device that serves as the provider; meanwhile, data required by each control device is stored in the memory sharing resource pool, and each control device can share data of another control device, thereby solving a problem of information sharing in a distributed system and improving real-time performance of information sharing between distributed systems.

Figure 8:
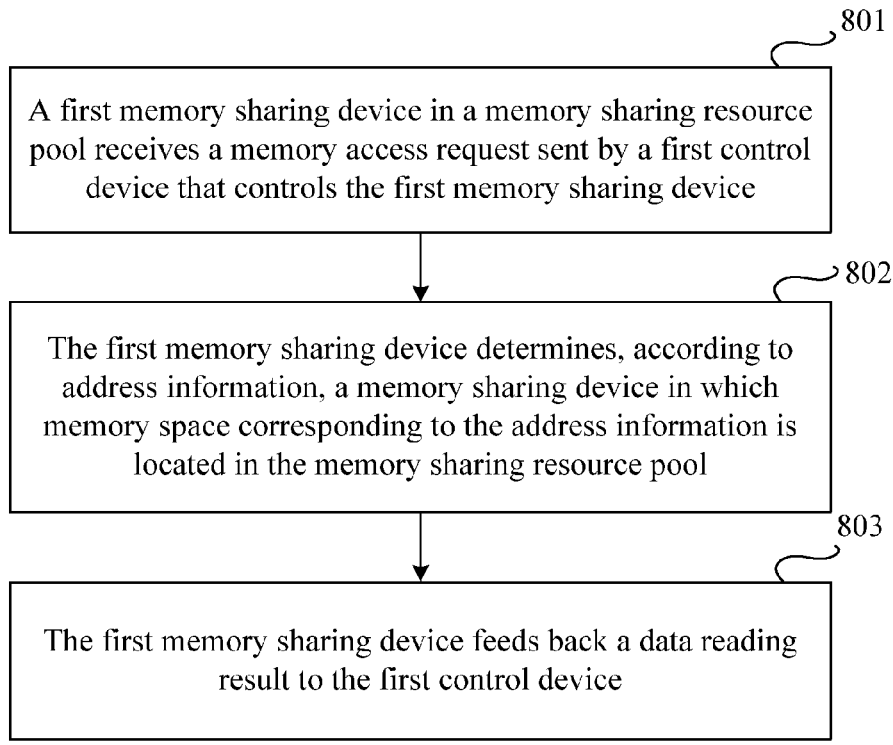
FIG. 8 is a flowchart of a data reading method according to an embodiment of the present disclosure.

Correspondingly, an embodiment of the present disclosure provides a data reading method, where the data reading method is executed by the memory sharing device in the foregoing embodiments. As shown in FIG. 8, the method includes:

801. A first memory sharing device in a memory sharing resource pool receives a memory access request sent by a first control device that controls the first memory sharing device, where the memory access request includes address information that has undergone unified addressing.

The address information is address information of multiple memory units that have undergone the unified addressing; the multiple memory units are configured to store data and are located in at least two memory sharing devices in the memory sharing resource pool. Any memory sharing device in the at least two memory sharing devices reads data under control of one control device in at least two control devices, and the first memory sharing device is one of the at least two memory sharing devices.

Before the first memory sharing device in the memory sharing resource pool receives the memory access request sent by the first control device, the method may further include the following.

The first memory sharing device broadcasts a query message to second memory sharing devices in the memory sharing resource pool, to acquire addressing data of memory units in all memory sharing devices in the memory sharing resource pool; then the first memory sharing device may store the addressing data in a form of an address information table, which is convenient for the first memory sharing device to look up memory units corresponding to the address information.

802. The first memory sharing device determines, according to the address information, a memory sharing device in which memory space corresponding to the address information is located in the memory sharing resource pool.

The first memory sharing device can determine, according to the address information, specific locations in which the memory units corresponding to the address information are located in a search manner in an address information table in a processing module of the first memory sharing device.

If the memory sharing device in which the memory units corresponding to the address information are located is the first memory sharing device, the first memory sharing device reads data from the memory units in the first memory sharing device.

If the memory sharing device in which the memory units corresponding to the address information are located is another memory sharing devices in the memory sharing resource pool, for example, a second memory sharing device, the first memory sharing device can forward the memory access request to the second memory sharing device, and then wait for a data reading result that is fed back to the first memory sharing device after the second memory sharing device reads data from the memory units in the second memory sharing device according to the address information in the memory access request.

After the first memory sharing device determines, according to the address information, the memory sharing device in which the memory units corresponding to the address information are located, if a first part of memory units in the memory units corresponding to the address information are in the first memory sharing device and a second part is in the second memory sharing device, the first memory sharing device reads data in the first part of the memory units from the memory units in the first memory sharing device, the first memory sharing device deletes addresses of the first part of the memory units in the address information in the memory access request, and forwards a memory access request including only addresses of the second part of the memory units to the second memory sharing device, and then the first memory sharing device receives the data reading result returned by the second memory sharing device.

803. The first memory sharing device feeds back the data reading result to the first control device.

The first memory sharing device reads data required by the first control device from the memory units in the first memory sharing device itself, or receives data that is required by the first memory sharing device and is fed back by the second memory sharing device in the memory sharing resource pool, or sends data read locally and data read from the second memory sharing device as a data reading result to the first control device through a communication interface.

According to the foregoing method, when a certain control device in a data access system needs to read data from a memory sharing resource pool, even if required data is not in a memory sharing device controlled by the control device, another control device does not need to participate, thereby decreasing consumption of a CPU in a control device in the data access system.

Figure 9:
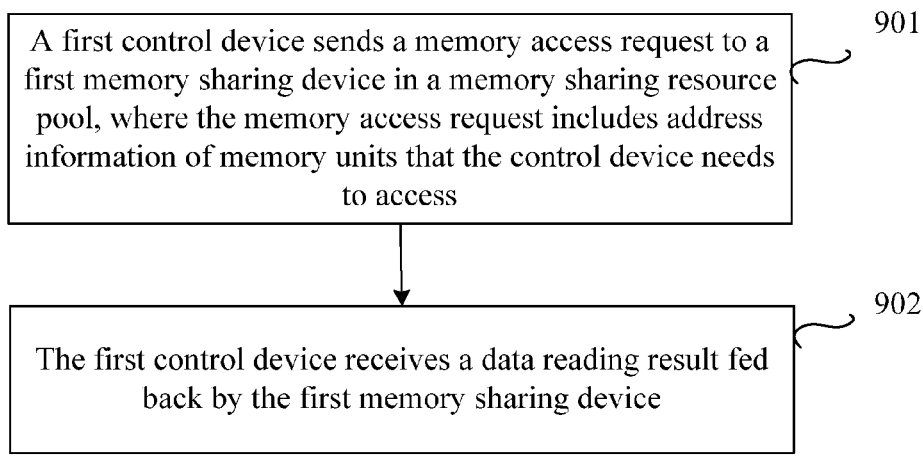
FIG. 9 is a flowchart of another embodiment of the data reading method according to the embodiment of the present disclosure.

Correspondingly, from the perspective of a control device, a data reading process is shown in FIG. 9, and the method includes:

901. A first control device sends a memory access request to a first memory sharing device in a memory sharing resource pool, where the memory access request includes address information of memory units that the control device needs to access.

The address information is address information of memory units that have undergone unified addressing in all memory sharing devices in the entire memory sharing resource pool; any memory sharing device in the memory sharing resource pool reads data under control of one control device in at least two control devices; the first memory sharing device is one of at least two memory sharing devices.

902. The first control device receives a data reading result fed back by the first memory sharing device.

If a memory sharing device in which memory space corresponding to the address information is located is the first memory sharing device, the data reading result fed back by the first memory sharing device is generated by the first memory sharing device after the first memory sharing device reads data from memory units in the first memory sharing device.

If the memory sharing device in which memory units corresponding to the address information are located is a second memory sharing device, the data reading result fed back by the first memory sharing device is a data reading result that is sent by the second memory sharing device and is received by the first memory sharing device.

If a first part of memory units in the memory units corresponding to the address information are in the first memory sharing device and a second part is in the second memory sharing device, the data reading result fed back by the first memory sharing device is data in the first part of the memory units in the first memory sharing device and data in the second part of the memory units in the second memory sharing device.

According to the data reading method provided in the foregoing embodiment, data in any memory sharing device in a memory sharing resource pool can be read by using one control device, without participation of a CPU in another control device.

Figure 10:
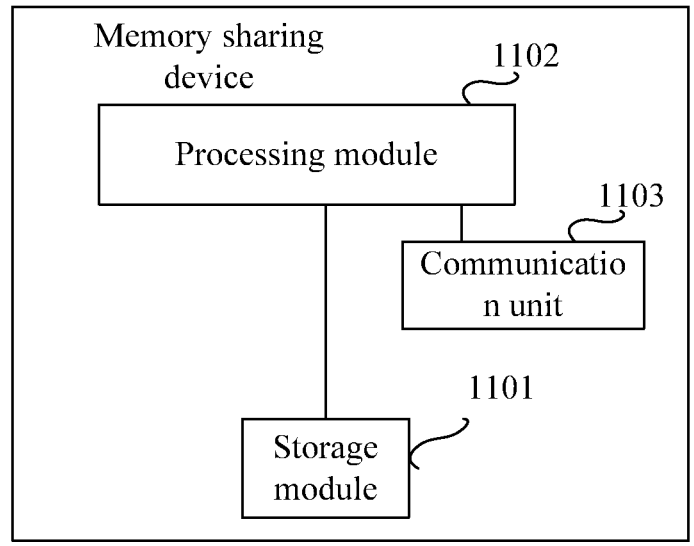
FIG. 10 is a schematic structural diagram of an implementation manner of a memory sharing device according to the present disclosure.

Correspondingly, an embodiment of the present disclosure provides a memory sharing device. As shown in FIG. 10, the memory sharing device includes a storage module 1101, a processing module 1102, and a communication unit 1103.

The storage module 1101 is connected to the processing module 1102 and is configured to store data.

The processing module 1102 is connected to one control device by using a communication interface, is connected, via the communication unit 1103, to a second memory sharing device in a memory sharing resource pool in which the memory sharing device is located, receives, through the communication interface, memory access requests that are sent by the control device connected to the processing module 1102, receives, by using the communication unit 1103, memory access requests that are forwarded by the second memory sharing device in the memory sharing resource pool, and/or forwards, to the second memory sharing device in the memory sharing resource pool, the memory access requests that are sent by the control device, where the memory access requests that are forwarded by the second memory sharing device are received by the second memory sharing device from a corresponding control device, the memory access requests include address information of memory units that have undergone unified addressing in multiple memory sharing devices in the memory sharing resource pool, and the address information is used to acquire data in a memory unit in any memory sharing device in the memory sharing resource pool.

The storage module 1101 connected to the processing module 1102 includes multiple memory units that are configured to store data, and the memory units undergo the unified addressing in the multiple memory sharing devices in the memory sharing resource pool.

Preferably, the processing module 1102 may be implemented by an FPGA or a central processing unit chip.

For example, the processing module 1102 may include a querying unit, where the querying unit broadcasts a query message to all memory sharing devices in the memory sharing resource pool by using the communication unit 1103, to acquire addressing information of memory units in all the memory sharing devices in the memory sharing resource pool, and then store the addressing information in a form of an address information table.

The processing module 1102 receives the memory access requests from the communication interface (for example, a high-speed system bus, an Ethernet interface, or a switch), and determines, according to the address information in the memory access requests and the address information table stored in the processing module 1102, a memory sharing device in which memory space corresponding to the address information is located.

If the memory sharing device in which the memory space corresponding to the address information is located is the local memory sharing device, the processing module 1102 reads data from memory units that are in the storage module 1101 and correspond to the address information.

If the memory sharing device in which the memory space corresponding to the address information is located is the second memory sharing devices connected to the communication unit 1103, the processing module 1102 forwards the memory access requests to the second memory sharing devices by using the communication unit.

If a first part of memory units in memory units corresponding to the address information are in the local memory sharing device and a second part of memory units are in the second memory sharing devices, the processing module 1102 reads data in the first part of the memory units from the storage module 1101 in the local memory sharing device, deletes addresses of the first part of the memory units in the address information in the memory access requests, and forwards a memory access request including only addresses of the second part of the memory units to a second memory sharing device by using the communication unit 1103.

The memory sharing device and the second memory sharing devices first form a virtual memory sharing resource pool, and a process of forming the virtual memory sharing resource pool is that the processing module 1102 in each memory sharing device performs addressing for memory units in the storage module 1101 of each memory sharing device, defines storage space of each memory sharing device, connects multiple memory sharing devices together by using a same communication interface, so that the multiple memory sharing devices belong to a same switched domain, performs unified addressing partition on memory units in storage modules 1101 in the multiple memory sharing devices in the switched domain, and informs the processing module 1102 in each memory sharing device of the partitioned-addressing information, to form the virtual memory sharing resource pool.

The processing module 1102 in the memory sharing device writes data into the memory units in the storage module 1101, so that data required by control devices is stored in the memory units. In a process in which the processing module 1102 writes data, the control devices informs the processing module 1102 in the memory sharing device of a storage location of the data, so that the processing module 1102 in the memory sharing device correctly writes data into a content unit according to addressing partition of the memory units of the memory sharing device.

When the memory sharing device receives a memory access request that a first control device that serves as an acquirer needs to acquire data from the memory sharing resource pool, the memory access request includes address information of the data that the first control device wants to acquire. The processing module 1102 determines, according to the address information, a memory sharing device in which memory units corresponding to the address information are located in the memory sharing resource pool.

The processing module 1102 determines, by using a determining unit according to the address information, specific locations in which the memory units corresponding to the address information are located in the address information table of the processing module 1102 in a search manner.

If the memory sharing device in which the memory units corresponding to the address information are located is the local memory sharing device, the processing module 1102 in the memory sharing device reads data from the memory units in the storage module 1101.

If the memory sharing device in which the memory space corresponding to the address information is located is another memory sharing device in the memory sharing resource pool, for example, a second memory sharing device, the memory sharing device can forward the memory access request to the second memory sharing device by using the processing module 1102 and the communication unit 1103, and then wait for a data reading result that is fed back to a first memory sharing device after the second memory sharing device reads data from the memory units in the second memory sharing device according to the address information in the memory access request.

The memory sharing device reads data required by the first control device from the storage module of the memory sharing device, or sends a data reading result to the control device through the communication interface after receiving data that is required by the control device and is fed back by the second memory sharing device in the memory sharing resource pool.

Figure 11:
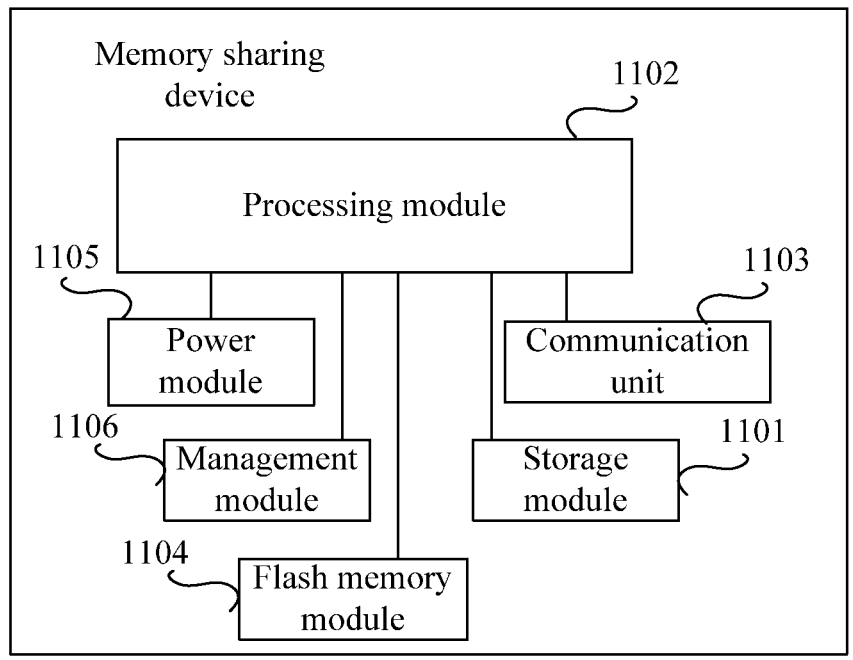
FIG. 11 is a schematic structural diagram of another implementation manner of the memory sharing device according to the present disclosure.

As shown in FIG. 11, in a preferred implementation manner, the memory sharing device may further include a power module 1105 configured to provide power for the memory sharing device when an external power supply fails. By using the power module 1105, the memory sharing device can form an NVRAM. The power module 1105 may be a supercapacitor or a battery backup unit (BBU).

In a preferred implementation manner, the memory sharing device may further include a flash memory module 1104 configured to store an application program, where the application program includes an instruction executed by the processing module.

In a preferred implementation manner, the memory sharing device may further include a management module 1106 configured to debug an application program in the storage module 1101 and control traffic in the communication unit 1103, where the management module 1106 may be implemented by a CPU IP kernel.

The memory sharing device provided in this embodiment of the present disclosure performs a search and determines a location of a corresponding memory unit according to a received memory access request; when the corresponding memory unit is in a local storage module, the memory sharing device directly accesses the memory unit, acquires data from the memory unit, and feeds back a result message carrying the acquired data to a control device. In this embodiment of the present disclosure, a specific process of accessing and acquiring data in a memory unit is completed by a first memory sharing device, thereby replacing a CPU in a control device that serves as a provider in the prior art, reducing a workload of the CPU in the control device that serves as the provider in the prior art, and increasing usage of the CPU in the control device that serves as the provider.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In combination with the embodiments disclosed in this specification, method or algorithm steps may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a Compact Disc Read-Only Memory (CD-ROM), or a storage medium in any other forms well-known in the art.

The foregoing specific embodiments clarify the objective, technical solutions, and benefits of the present disclosure in detail. It should be understood that the foregoing descriptions are merely specific embodiments of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A storage system, comprising:
    a control apparatus configured to send a data access request to a first memory sharing device, wherein the data access request includes an address of target data;
    the first memory sharing device configured to:
        determine that the target data is stored in a second memory sharing device according to the address of the target data and an address list, wherein the address list includes corresponding relationships between addresses and memory sharing devices;
        forward the data access request to the second memory sharing device, wherein first addresses corresponding to the first memory sharing device are different from second addresses corresponding to the second memory sharing device; and
        forward the target data to the control apparatus, and
    wherein the second memory sharing device configured to:
        obtain the target data based on the address of the target data; and
        send the target data to the first memory sharing device.

2. The storage system according to claim 1, wherein the first memory sharing device comprises a first cache memory, and wherein the first memory sharing device is further configured to:
    address a storage space of the first cache memory into the first addresses, wherein each of the first addresses is used to identify a part of the storage space of the first cache memory; and
    record corresponding relationships between the first addresses and the first memory sharing device into the address list.

3. The storage system according to claim 2, wherein the second memory sharing device comprises a second cache memory, wherein the second memory sharing device is further configured to address a storage space of the second cache memory into the second addresses, wherein each of the second addresses is used to identify a part of the storage space of the second cache memory, and wherein the first memory sharing device is further configured to:
    receive the second addresses from the second memory sharing device; and
    record corresponding relationships between the second addresses and the second memory sharing device into the address list.

4. A memory sharing device, comprising:
    an interface configured to communicate with a control apparatus included in the storage system;
    a cache memory configured to store data; and
    a processor configured to:
        receive a data access request through the interface from the control apparatus, wherein the data access request includes an address of target data;
        determine that the target data is stored in a second memory sharing device according to the address of the target data and an address list, wherein the address list includes corresponding relationships between addresses and each memory sharing device in the storage system, and wherein first addresses corresponding to the memory sharing device are different from second addresses corresponding to the second memory sharing device;
        forward the data access request to the second memory sharing device;
        receive the target data sent from the second memory sharing device; and
        forward the target data to the control apparatus through the interface.

5. The memory sharing device according to claim 4, wherein the processor is further configured to:
    address a storage space of the cache memory into the first addresses, wherein each of the first addresses is used to identify a part of the storage space of the cache memory; and
    record corresponding relationships between the first addresses and the memory sharing device into the address list.

6. The memory sharing device according to claim 4, wherein the processor is further configured to:
    receive second addresses from the second memory sharing device; and
    record corresponding relationships between the second addresses and the second memory sharing device into the address list.

7. A method for enabling a control apparatus to read data from memory sharing devices included in a storage system, the method comprising:
    sending, by the control apparatus, a data access request to a first memory sharing device, wherein the data access request includes an address of target data;
    determining, by the first memory sharing device, the target data is stored in a second memory sharing device according to the address of the target data and an address list, wherein the address list includes corresponding relationships between addresses and each memory sharing device, and wherein first addresses corresponding to the first memory sharing device are different from second addresses corresponding to the second memory sharing device;

forwarding, by the first memory sharing device, the data access request to the second memory sharing device;

obtaining, by the second memory sharing device, the target data based on the address of the target data;

sending, by the second memory sharing device, the target data to the first memory sharing device; and forwarding, by the first memory sharing device, the target data to the control apparatus.

8. The method according to claim 7, wherein the first memory sharing device comprises a first cache memory, and wherein the method further comprises:

addressing, by the first memory sharing device, a storage space of the first cache memory into the first addresses, wherein each of the first addresses is used to identify a part of the storage space of the first cache memory; and recording, by the first memory sharing device, corresponding relationships between the first addresses and the first memory sharing device into the address list.

9. The method according to claim 7, wherein the second memory sharing device comprises a second cache memory, and wherein the method further comprises:

addressing, by the second memory sharing device, a storage space of the second cache memory into the second addresses, wherein each of the second addresses is used to identify a part of the storage space of the second cache memory;

sending, by the second memory sharing device, the second addresses; and recording, by the first memory sharing device, corresponding relationships between the second addresses and the second memory sharing device into the address list.

* * * * *